United States Patent [19]

Taniguchi

[11] Patent Number: 5,438,574
[45] Date of Patent: Aug. 1, 1995

[54] PROGRAM DEBUGGING DEVICE AND PROCESS

[75] Inventor: Masayuki Taniguchi, Aichi, Japan

[73] Assignee: Mitsubishi Denki Kabushiki Kaisha, Tokyo, Japan

[21] Appl. No.: 181,954

[22] Filed: Jan. 18, 1994

Related U.S. Application Data

[63] Continuation of Ser. No. 831,105, Feb. 4, 1992, abandoned.

[30] Foreign Application Priority Data

Feb. 5, 1991 [JP] Japan ................... 3-014373

[51] Int. Cl.[6] ............................................. G06F 11/00
[52] U.S. Cl. .............................. 395/183.14; 371/25.1; 395/650; 395/700
[58] Field of Search ........................................... 371/19

[56] References Cited

U.S. PATENT DOCUMENTS

| | | | |
|---|---|---|---|
| 3,711,863 | 1/1973 | Bloom | 371/19 |
| 4,108,359 | 8/1978 | Proto . | |
| 4,183,462 | 1/1980 | Hideshima et al. . | |
| 4,571,677 | 2/1986 | Hirayama et al. | 371/19 |
| 4,858,101 | 8/1989 | Stewart et al. . | |
| 5,056,013 | 10/1991 | Yamamoto | 371/19 |
| 5,170,339 | 12/1992 | Kiya et al. . | |
| 5,265,005 | 11/1993 | Schmidt et al. . | |
| 5,287,548 | 2/1994 | Flood et al. . | |

FOREIGN PATENT DOCUMENTS

3704318 8/1988 Germany .

OTHER PUBLICATIONS

*Structured Computer Organization* by Andrew S. Tanenbaum, ©1990 by Prentice-Hall Inc. pp. 31–34 and 297–307.

*Primary Examiner*—Vincent P. Canney
*Attorney, Agent, or Firm*—Sughrue, Mion, Zinn, Macpeak & Seas; Richard C. Turner

[57] ABSTRACT

A process and apparatus for debugging a sequentially executed program, such as an SFC program having a plurality of blocks containing a plurality of steps, wherein a desired program route is registered in a normal route table, by block and step identifier, and used as a basis for comparison with the program as it is actually run by block and step, and recorded in a executed route table. Where a difference is identified, the program run may be either stopped and the current block and step displayed, or the program may continue its run and each identified difference recorded in a faulty route table, for later display.

17 Claims, 11 Drawing Sheets

| I | EXECUTED ROUTE BLOCK | EXECUTED ROUTE STEP |
|---|---|---|
| 1 | 0 | 0 |
| 2 | 0 | 1 |
| 3 | 3 | 0 |
| 4 | 3 | 1 |
| 5 | 3 | 2 |
| 6 | 3 | 3 |
| 7 | 0 | 4 |
| 8 | 0 | 6 |

FIG. 6

| E | FAULTY ROUTE BLOCK | FAULTY ROUTE STEP |
|---|---|---|
| 1 | 3 | 0 |
| 2 | 3 | 1 |
| 3 | 3 | 2 |
| 4 | 3 | 3 |
| 5 | 0 | 4 |

PROGRAM DEBUGGING DEVICE AND PROCESS

This is a Continuation of application Ser. No. 07/831,105 filed Feb. 4, 1992, now abandoned.

BACKGROUND OF THE INVENTION

1. Field of the Invention

The present invention relates to a device and a process for debugging a program to be run by a programmable controller.

2. Description of the Background

SFC (Sequential Function Chart) is a programming language which allows a program running procedure and conditions to be clearly represented, by dividing the sequence of a program into a plurality of steps in a flowchart format. An SFC may be utilized to represent a program for a programmable controller (hereinafter referred to as the "PC") which program-controls an object to be controlled. The development of a debugging device and a debugging process that facilitates more effective program writing is desired in order to permit the SFC type program to be used in a wide variety of applications. A "step break method" is one of the conventional debugging processes used with a debugging device for SFC-based programs in PC applications.

Figure 10:
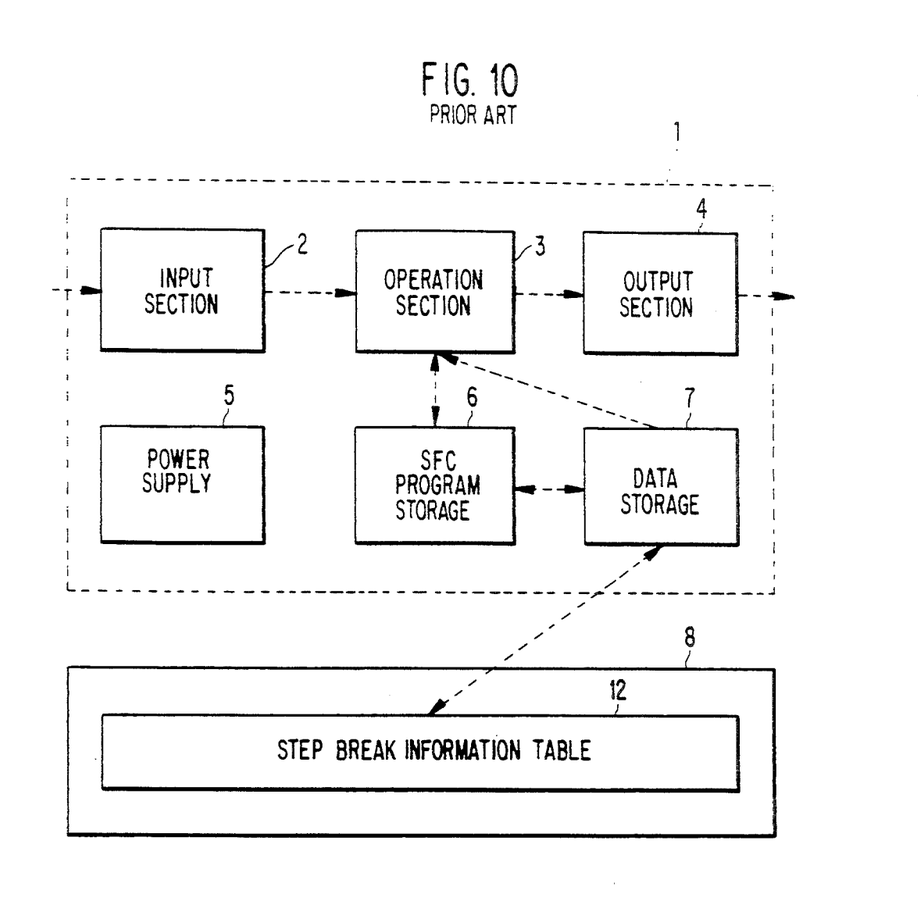
FIG. 10 is a block diagram illustrating a conventional PC and peripheral device.

FIG. 10 is a block diagram illustrating a CPU module of the PC and a peripheral device for writing a program for the PC, for debugging the program written, for monitoring the program when it is run, and for other purposes. In FIG. 10, the numeral 1 indicates a CPU module of the PC, comprising an input section 2 through which data is entered from other modules (not illustrated), an operation section 3 for performing data operations, an output section 4 for outputting data to other modules (not illustrated), a power supply section 5 acting as the power supply of the entire module, an SFC program storage 6 for storing an SFC program which corresponds to the program being run by CPU 1, and a data storage 7 for storing data incoming from a peripheral device 8 and exchanging information with the SFC program storage 6. The peripheral device 8 has structure to perform a program writing function, a written program monitoring function and a debugging function, and includes a step break information table 12 for storing information on step breaks for program debugging.

Figure 11:
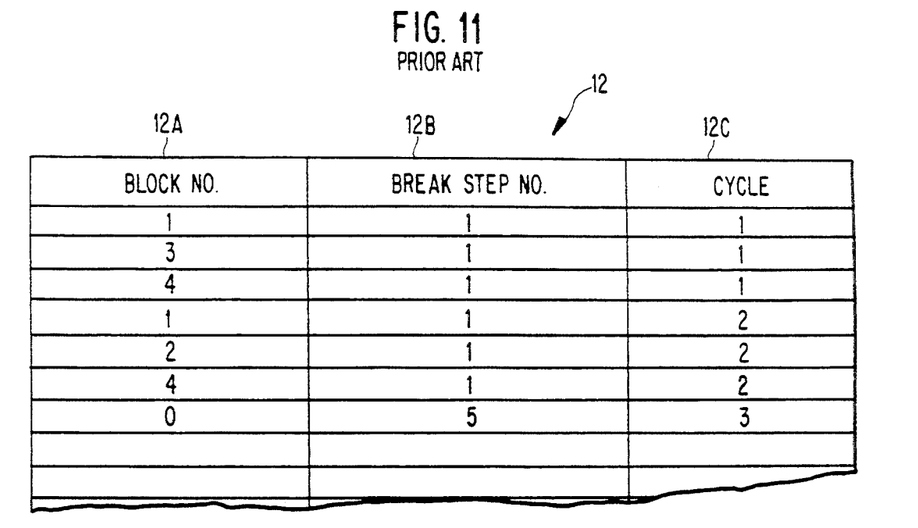
FIG. 11 shows a conventional step break information table.
Figure 12:
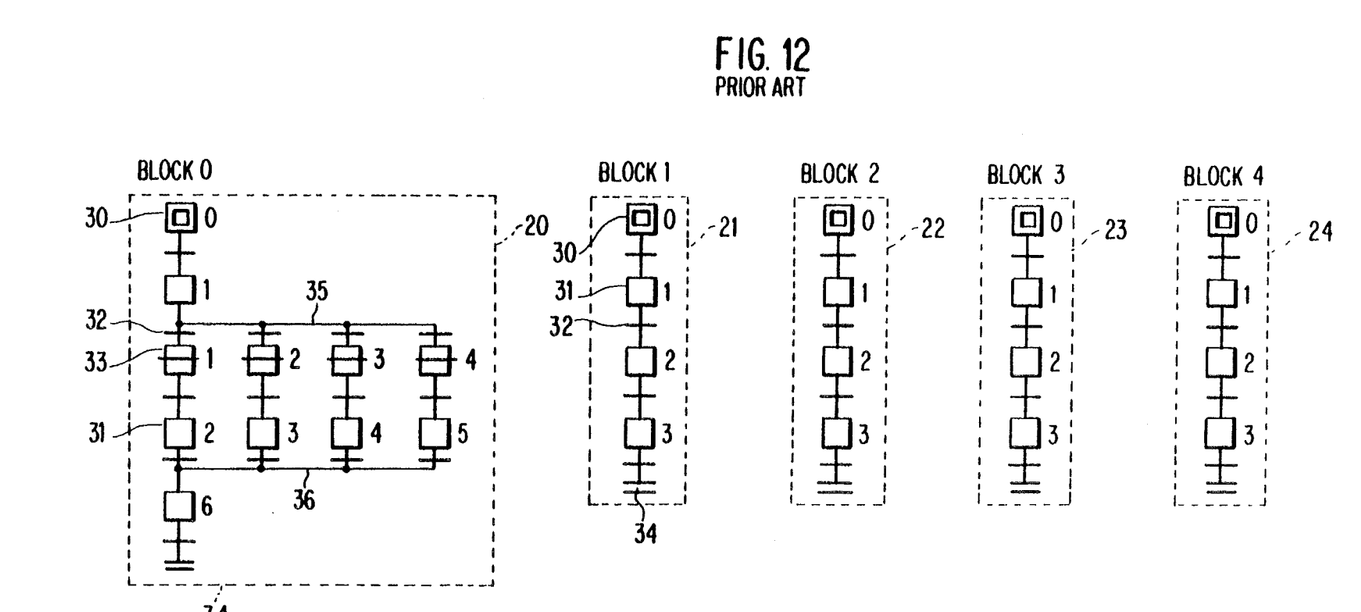
FIG. 12 shows a shown SFC program example.
Figure 13:
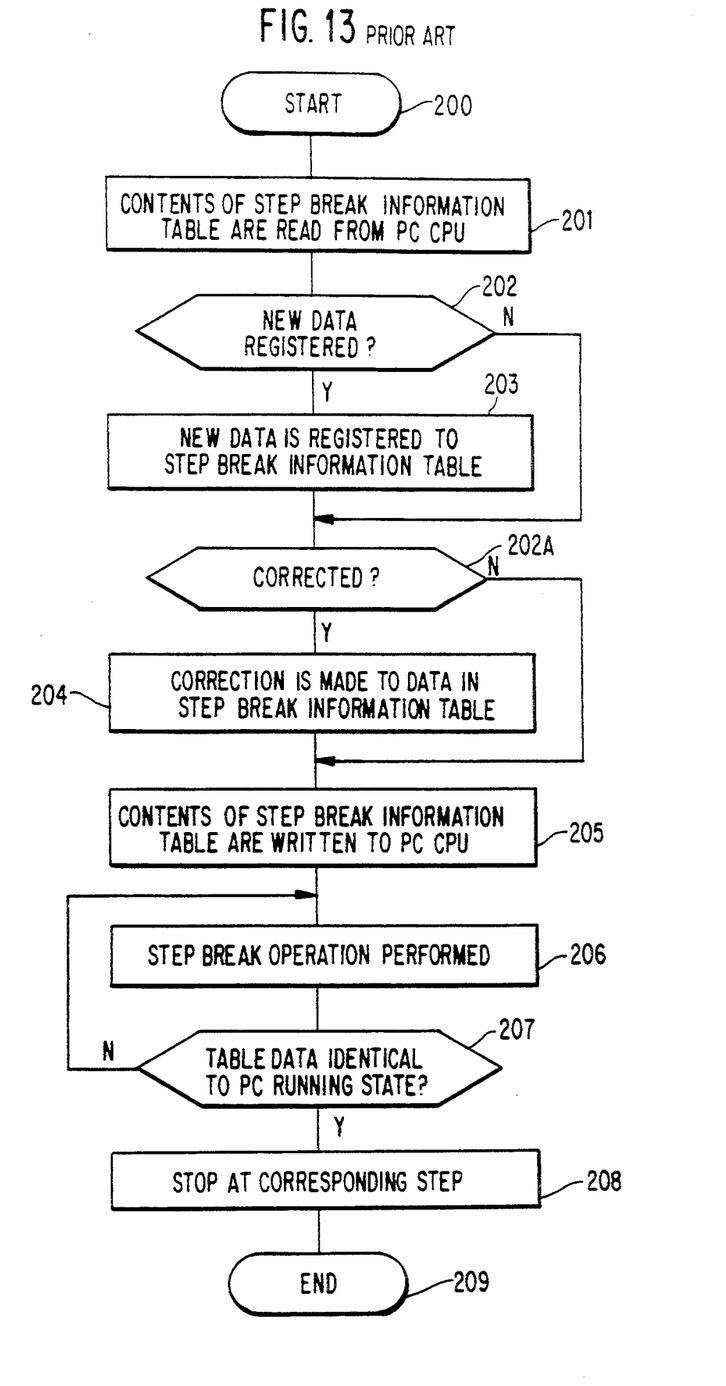
FIG. 13 is an SFC program debugging processing flowchart according to a conventional step break method.

FIG. 11 shows the contents of the step break table 12 comprising block numbers 12A, break step numbers 12B and cycles 12C. FIG. 12 gives an SFC program example, and FIG. 13 is a flowchart illustrating a step break processing procedure.

As shown in FIG. 12, the SFC program is made up of blocks 20 to 24. Each block includes at least (i) an initial step 30, which indicates the beginning of the block; (ii) basic steps 31, which are basic units within a block comprising execution units of the SFC program; (iii) transition conditions 32, which are the conditions of transition to the next step; (iv) block driving steps 33 for starting another block; and, (v) an end step 34 for declaring that a series of block processings has been completed. The group from the initial step 30 to the end step 34 is referred to as a "block". In a current program environment, a maximum of 256 blocks, e.g., (0) to (255), can exist in a SFC program. Conventionally, block (0) is referred to as a "main block" 20, from which the run of the SFC program begins. Within any of the blocks, another block may be specified by a user at the block driving step 33 and the run of the program will shift to the specified block. In the initial step 30, at basic steps 31 and transition conditions 32, the corresponding detailed sequence programs of a PC may be written using ladders or the like.

As shown in the SFC program example of FIG. 12, the main block 20, i.e., Block 0, includes a selective branch 35. The selective branch will execute only a step where a transition condition has been first enabled among a plurality of steps 31 connected in parallel. Also included is a selective connection 36 for terminating the processing performed by the selective branch 35. In an operation of the program, beginning with the main block 20, step (1) is first executed. After the step (1) 31 is executed, selection processing is performed because of the transition condition 32. The condition leads to four block driving steps (1)–(4). By executing any one of the block driving steps (1) to (4), any of the routes starting from corresponding Block (1), (2), (3), or (4) is executed. When any of the Blocks (1), (2), (3) and (4) has been selected, the steps in the selected Block are executed in order from the initial step 30 to the end step 34. When the end step 34 has been executed, the program execution returns to the initial step 30 of Block (0) and forces a block driving step 33 to be executed starting from the next transition condition. After any of the steps (2), (3), (4) and (5) has been executed, the step (6) is processed. When the end step 34 is executed, the program execution returns to the initial step 30 again and the series of operations is then repeated. Instead of the above simple description of the SFC, a more complex operation may be conducted, as would be apparent to one of ordinary skill in the art.

The establishment and operation of a step break process, one of the known debugging processes, will now be described in reference to the flowchart shown in FIG. 13 and the illustrations in FIGS. 10–12. In the establishment of a step break process by the peripheral device 8, a start is first effected at step 200. Any previously existing step break information is read from the data storage 7 of the PC CPU module 1 into table 12 of the peripheral device 8, at step 201. Then, at step 202, the user determines whether or not totally new data on step break points (i.e. a whole new table) is to be registered into the step break information table 12 or whether simple additions or corrections alone are desired. When totally new data is to be registered, at step 203, the user registers in table 12 the block numbers 12A at which a break is desired to occur, the step numbers 12B at which a break is desired to occur, and the numbers of cycles 12C after which a break is desired to occur at the specified step. The new data is registered in place of the previously written data in the step block information table 12, which was read from memory 7 at the step 201. If the user determines that all new data is not to be registered, then the process proceeds directly to step 202A. At step 202A, a determination is made as to whether or not corrections should be made to the existing data. When only corrections are to be made to the existing data, the user corrects, at step 204, the block numbers 12A at which a break is desired to occur, the step numbers 12B at which a break is desired to occur, and/or the numbers of cycles 12C after which a break is desired to occur at the specified step. When corrections are not made to the existing data, or after completion of step 204, the contents of the step break information table 12 are then written into the data storage 7 of the PC CPU module 1, at step 205.

The processing of the PC CPU module 1 is then performed. First, the step break operation is started at step 206 and the PC program is run. The operation section 3 compares, at step 207, the data in the data storage 7, i.e., the blocks 12A and steps 12B in the step block information table 12, with the current run state of the SFC program stored in the SFC program storage 6, i.e., the current blocks and steps which correspond to the current portion of the PC program being run. If they do not match, the step 207 is repeated until they match. When they match, the step break operation is stopped at the corresponding step, at step 208, to terminate the processing.

The blocks 12A, the steps 12B in those blocks and the numbers of cycles 12C which are step break points registered into the step break information table 12, may be set as required. Ordinarily, the step break points should be provided at important points on a route other than the desired route, in order to check for a deviation from the desired route. However, the step break points may be strategically provided on a normal (desired) route to confirm that the normal route has been executed properly, thereby enhancing the debugging of the SFC program.

For example, assume that the step break information table is established as shown in FIG. 11 and is to be compared to the SFC program being run by CPU 2 in FIG. 12. Also assume that during the program's first cycle, it passes to Block 2; in the 2nd cycle, it passes to Block 3; and, in the 3rd cycle, it passes to Block 4. If the above sequence is the "normal route", then break points would be set on step 1 of each of Blocks 1, 3 and 4 in the 1st cycle, because a deviation from the "normal route" through Block 2 would be detected. Also, for similar reasons, break points are set on step 1 of each of Blocks 1, 2 and 4 in the 2nd cycle. For a different reason, explained subsequently, a break point is set on step 5 of Block 0 in the 3rd cycle. Thus, if a step break operation is performed when step break points are set on the above step break information table, and if it is run normally, step break will not occur either in the 1st or 2nd cycle, but it will occur at step 5 of Block 0 in the 3rd cycle. Specifically, a step break will occur after Block 4 is performed, thus confirming that up to the 3rd cycle, the program is run normally.

Nonetheless, the extensive use of step break points for debugging will result in programming inefficiencies. For example, when using the conventional SFC program debugging process as described above, a step break must be set at each pertinent branch point to check the route passed for each branch process in an SFC program. This causes the number of set breaks to increase as the number of branch processings increases, resulting in a cumbersome debugging process for the SFC program.

It is, accordingly, an object of the present invention to overcome the disadvantages in the conventional process by providing an SFC program debugging process which does not require step break setting and ensures ease of checking executed routes.

SUMMARY OF THE INVENTION

The present invention provides an SFC program debugging device and process which allows debugging in a first embodiment which allows the routes along which an SFC program is intended to run to be registered beforehand, a route along which the SFC program is actually run to be sequentially compared with the pre-registered route, the run of the SFC program to be stopped if any difference is found in the comparison, and the different block and step in the SFC program to be displayed as an error.

A second embodiment allows routes on which an SFC program is intended to run to be registered beforehand, an actual route on which the SFC program is running to be registered sequentially, the actual run route to be compared with the pre-registered normal route at the termination of a series of runs, and the blocks and steps in the SFC program where differences occur to be displayed as an error.

DESCRIPTION OF THE PREFERRED EMBODIMENTS

The first embodiment will be described with reference to FIGS. 1 to 4, wherein like reference characters employed in the conventional system designate like or corresponding parts therein.

Figure 1:
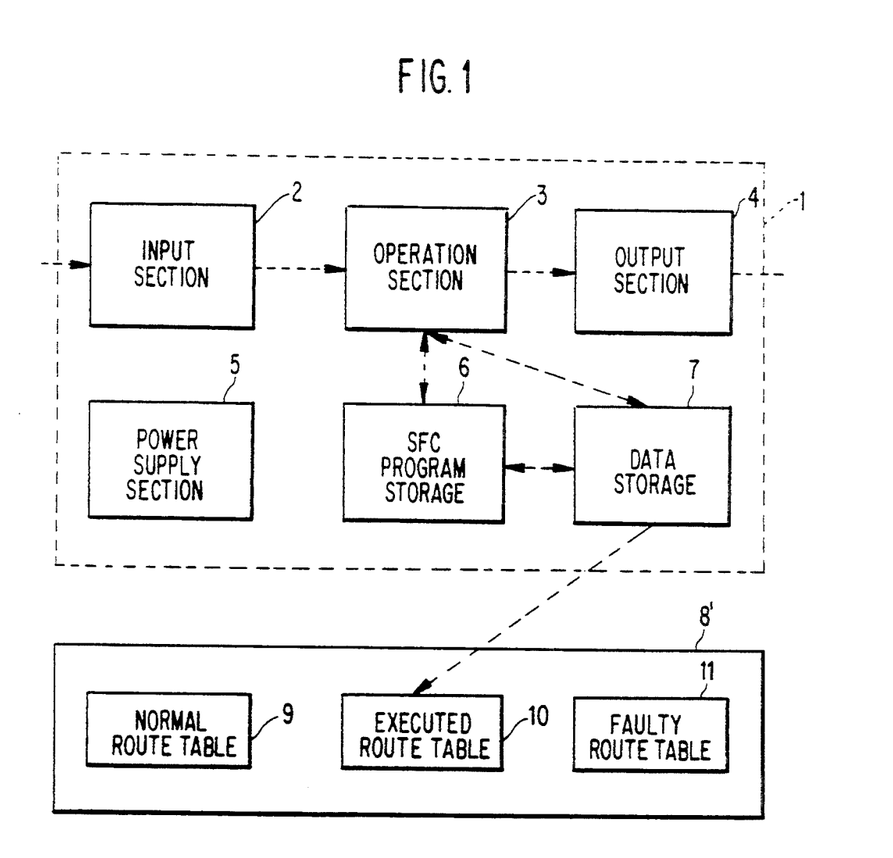
FIG. 1 is a block diagram illustrating a PC and a peripheral device acting as an SFC program debugging device according to the disclosed embodiments.

FIG. 1 is a block diagram illustrating a peripheral device 8 serving as a PC monitoring device equipped with an SFC program debugging function of the present invention. The configuration of the PC CPU module 1 is identical to that of the conventional system shown in FIG. 10. In FIG. 1, the numeral 8' indicates a peripheral device, which includes a normal route table 9 for storing normal routes, an executed route table 10 for storing executed routes, and a faulty route table 11 for storing faulty routes.

Figure 2:
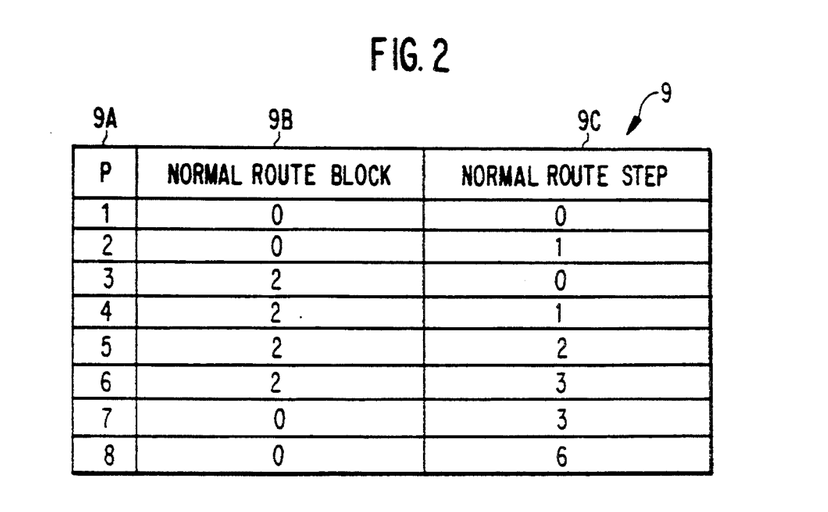
FIG. 2 shows the contents of a normal route table illustrated in FIG. 1.

FIG. 2 shows the contents of the normal route table 9 which consists of pointers P, identified by number 9A, normal route blocks 9B and normal route steps 9C.

Figure 3:
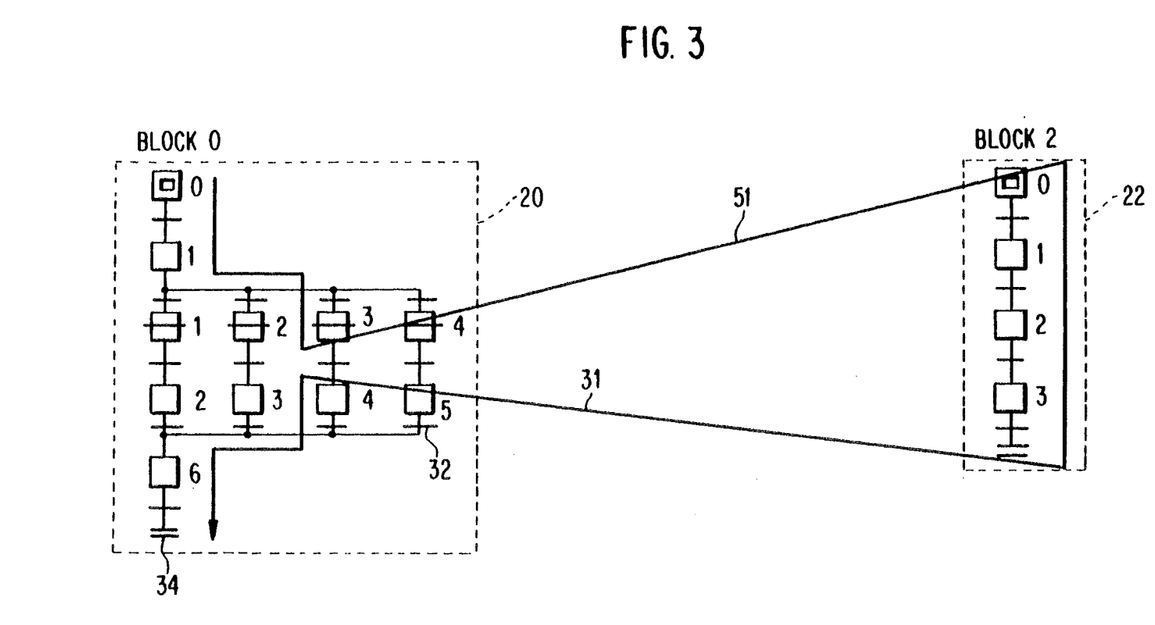
FIG. 3 gives an SFC program example illustrating the embodiment of the first and third embodiments.
Figure 4:
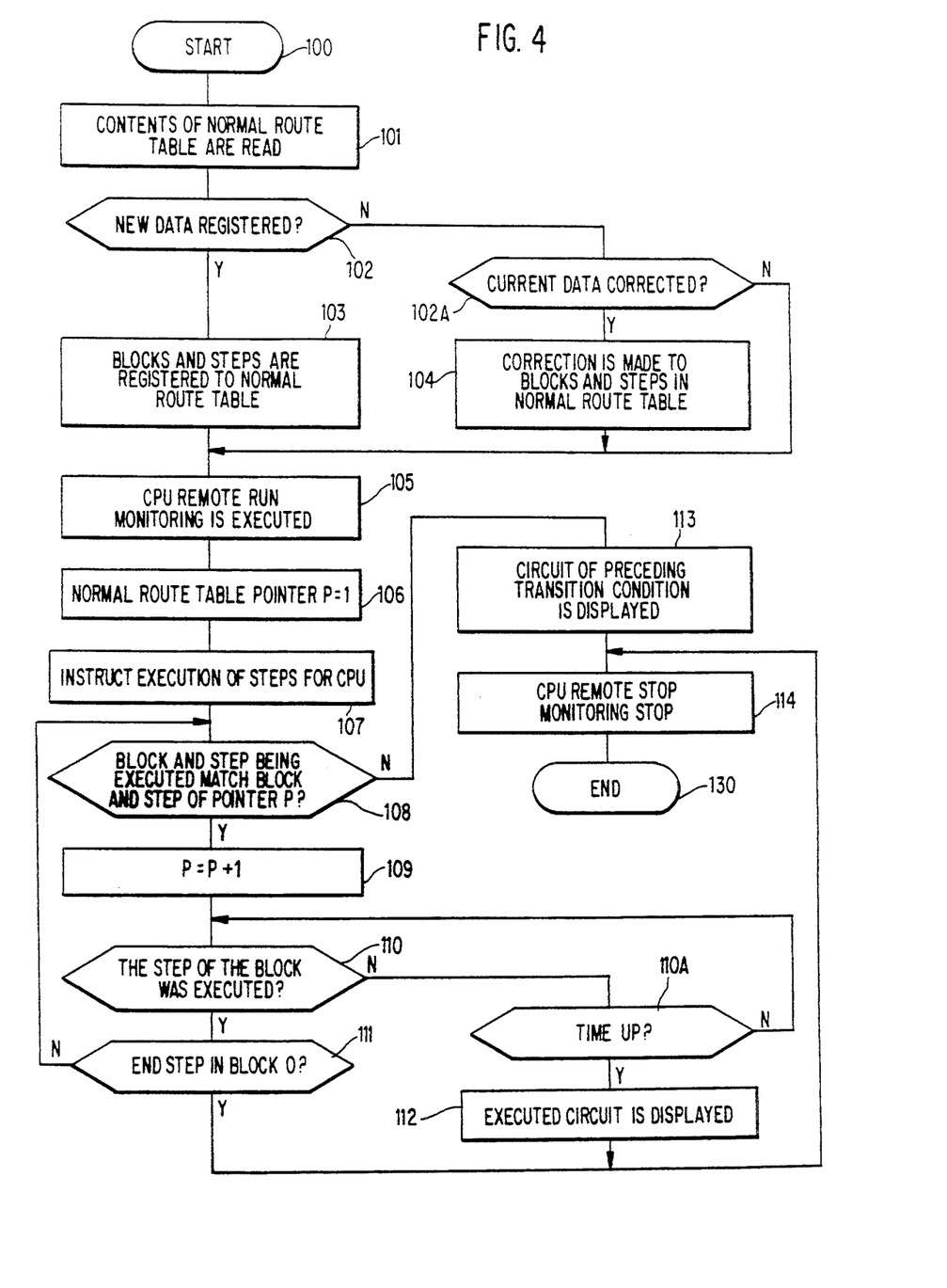
FIG. 4 is an SFC program debugging processing flowchart according to the first and third embodiments.

FIG. 3 provides an SFC program example, where path 51 represents a sequence of operation. FIG. 4 is a processing flowchart.

Operation will now be described in accordance with the processing flowchart in FIG. 4. The debugging processing in the first embodiment is performed only by the peripheral device 8' of the PC and the description of the operation focuses on peripheral device 8'.

First, execution is started at step 100. Before the monitoring of the SFC program is initiated, the contents of the normal route table 9 corresponding to a block of the program currently being displayed are read from the peripheral device 8' at step 101. The table output may be displayed to the user.

At step 102, the user reviews the displayed data and decides whether or not a normal route block 9B and/or a normal route step 9C in the current normal route table needs to be newly registered. If the user decides that a new registration is required, the new data is added at step 103. For example, if the SFC program shown in FIG. 3 is supposed to follow the route 51 during a normal run and would further proceed to step 51, the registration of this new information in the table 9 can be made. Specifically, the user registers Block (0) 20 and step 31 so that the normal run is extended according to the new data in the normal route table 9 of the peripheral device 8'.

After the user decides at step 102 that new registration is not required, then the user must decide at step 102A, whether or not block or step data should be corrected. If corrections are required, the user makes, at step 104, a correction to the block and step on route 51 where a normal run is made in the normal route table 9 of the peripheral device 8. If at step 102A corrections are not required, the process moves to step 105. Although not shown in the flow chart, the addition or correction of new data can be performed on a loop basis, if multiple additions or corrections are required.

The peripheral device 8' then gives a remote run command to the PC CPU module 1 at step 105, and starts monitoring the PC CPU module 1. When the monitoring is initiated, the value of the pointer 9A corresponding to the data in the normal route table 9 is first set to 1 at step 106. At step 107 the peripheral device 8' commands execution of a step within a block by the PC CPU module 1. At step 108, the peripheral device 8' compares, the block and step currently being executed by the PC CPU module 1 with the normal route block 9B and normal route step 9C of the pointer 9A in the normal route table 9. If they match, the pointer 9A in the normal route table 9 is incremented by 1 at step 109 to refer to the next normal route step 9C. At step 110, it is decided whether the execution of the current step in the current block of the running program has been completed. If the step has not been completed, at step 110A, it is decided if a predetermined time has not been exceed (time up). If the predetermined time has not been exceeded, then has process goes back to step 110, and repeats the above processing. If the predetermined time has been exceeded, the executed circuit will be displayed at step 112.

When execution of the current step has been completed, i.e., when the currently executed block or step has changed, this change is detected at step 110. Then at step 111, the peripheral device 8' determines whether or not the step currently being executed by the PC CPU module 1 is the end step 34 in the current block e.g. block (0) 20. When it is not the end step 34 in the current block, the program execution returns to the step 108 for further processing. The flowchart remains in the loop 110, 110A until the program proceeds to the next step for execution by the CPU, which should be the normal route block and step identified by the current portion in table 9. When the program reaches the end step 34 in the current block, the process moves to step 114 and the peripheral device 8 gives a remote stop command to the PC CPU module 1 and stops the monitoring of the PC CPU module 1 and the processing is terminated at step 130.

If the block and step of the program currently being executed by the PC CPU module 1 are different from the normal route block 9B and normal route step 9C then identified by the pointer 9A in the normal route table 9 the circuit of a transition condition 32 preceding the different step 31 is displayed 1 at step 113. The CPU remote stop and monitoring stop of step 114 is executed and the processing is terminated at step 130.

Figure 5:
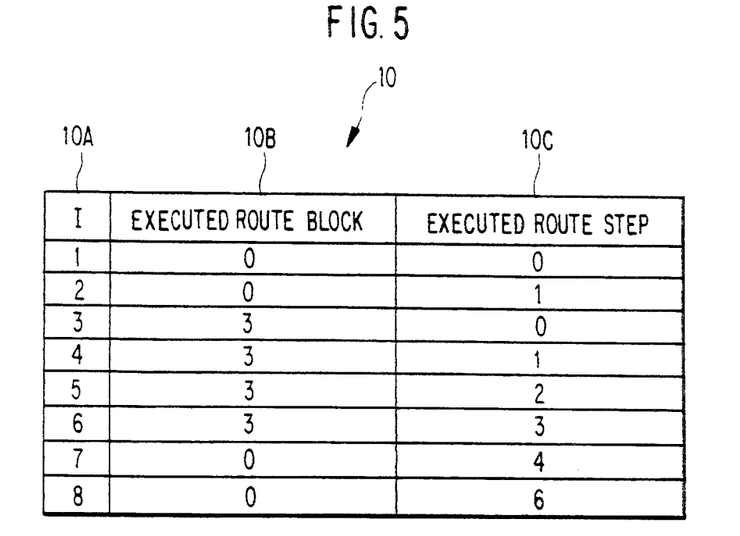
FIG. 5 shows the contents of an executed route table illustrated in FIG. 1.
Figure 6:
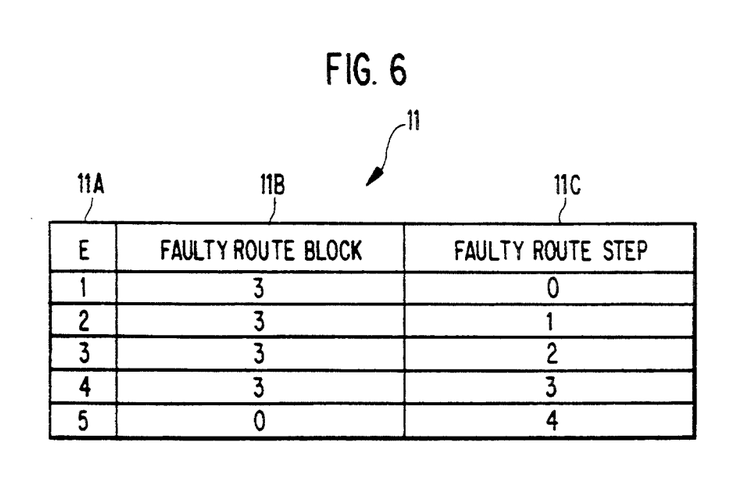
FIG. 6 shows the contents of a faulty route table illustrated in FIG. 1.
Figure 7:
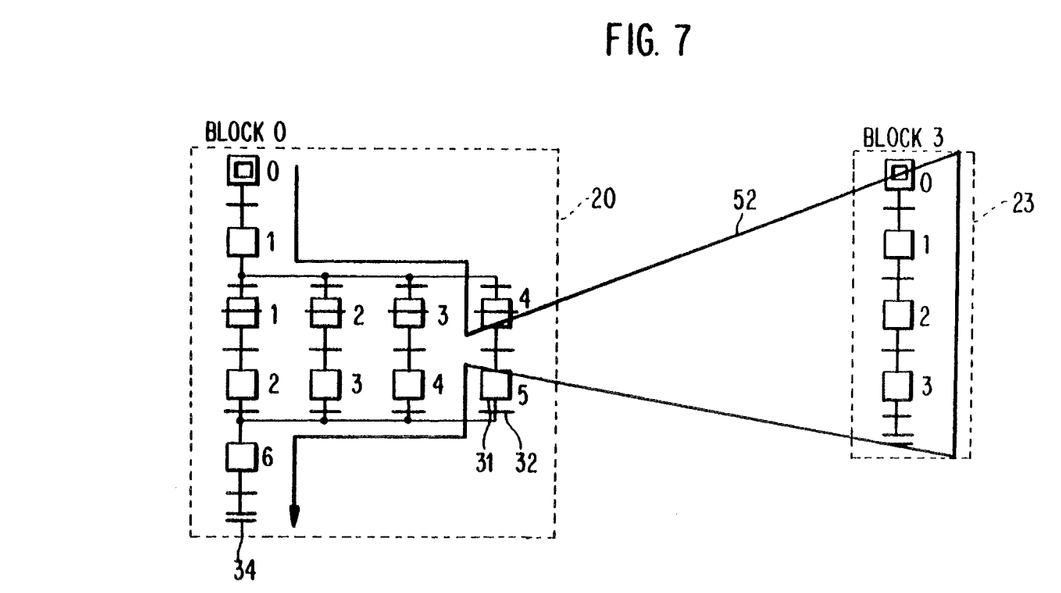
FIG. 7 gives an SFC program example illustrating the second and fourth embodiments.

The second embodiment will be described in accordance with FIGS. 1 to 3 and FIGS. 5 to 9. FIG. 5 shows the contents of the executed route table 10 which consists of pointers I 10A, executed route blocks 10B and executed route steps 10C. FIG. 6 provides the contents of the faulty route table 11 comprising error numbers 11A, faulty route blocks 11B and faulty route steps 11C. FIG. 7 gives an SFC program example and FIGS. 8 and 9 comprise a processing flowchart of the second embodiment. An SFC program debugging procedure according to the second embodiment is described below with reference to the processing flowchart in FIGS. 8 and 9 and the structures of FIGS. 1, 2, 5 and 6.

First, at step 101, the contents of the normal route table 9 corresponding to a block of the program currently being displayed are read from the peripheral device 8' of FIG. 1, before the monitoring of the SFC program about to be run is initiated. At step 102, when the user wishes to newly register a normal route block 9B and a normal route step 9C to the normal route table 9, the user registers the required data to the normal route table 9 of the peripheral device 8' as shown in FIG. 2 at step 103. Thereafter the program proceeds to step 102A. Also, if no new data is to be added, the program proceeds directly to step 102A. At step 102A, a determination is made as to whether data is to be corrected. If data is to be corrected, the user makes a correction to the normal route table 9 of the peripheral device 8' at step 104 and proceeds to step 105. If no new data or corrections are to be entered or made to the normal route table 9, the flowchart proceeds to step 105.

The peripheral device 8' gives a remote run command to the PC CPU module 1 at step 105, and starts monitoring the PC CPU module 1. Steps 100 to 105 are identical to those in the processing flowchart of the first embodiment illustrated in FIG. 4.

When the monitoring is initiated, the block and step of the program currently being executed by the PC CPU module 1, as on a route 52 in FIG. 7, are first stored into the executed route table 10 of the peripheral device 8' as shown in FIG. 5. Assuming that currently Block (0) 20 and step 0 of FIG. 7 are being executed, the table at pointer 1 (0,0) will be completed. Next the loop which is made out of steps 116 and 116A is executed. That is, at step 116, the step in the block which is currently executed is performed. If the current step has not been completed, at step 116A it is determined if a predetermined time has passed since the start of the execution (time up). If the currently executed step of the current block has been completed at the step 116, i.e., execution has changed to step 1, the peripheral device 8 determines, at step 117, whether or not the step currently being executed by the PC CPU module 1 is the end step 34 in the current block, e.g., Block (0) 20. If the execution has not yet reached the end step 34 in the current block e.g., Block (0) 20, it returns to step 115 and repeats the processing. When the end step 34 has been executed by the PC CPU module 1 at the step 117, the peripheral device 8' gives a remote stop command to the PC CPU module 1 at step 119 and stops the monitoring of the PC CPU module 1. If at step 116A the execution of the current step has exceeded a predetermined time, a "time up" alarm is displayed at step 118 and the processing moves to step 119 for a stop.

Figure 8:
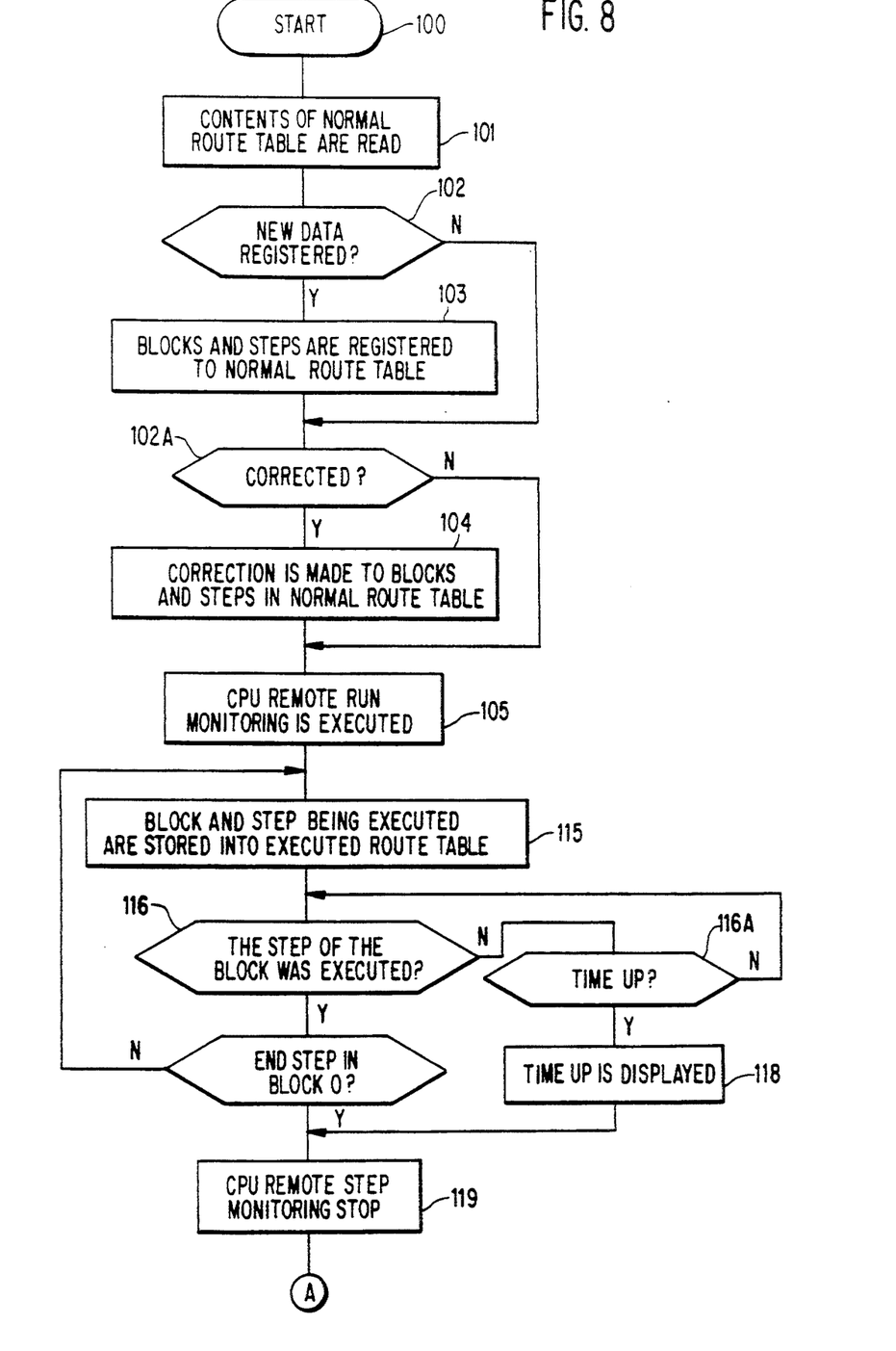
FIGS. 8 and 9 comprise an SFC program debugging processing flowchart according to the second and fourth embodiments.
Figure 9:
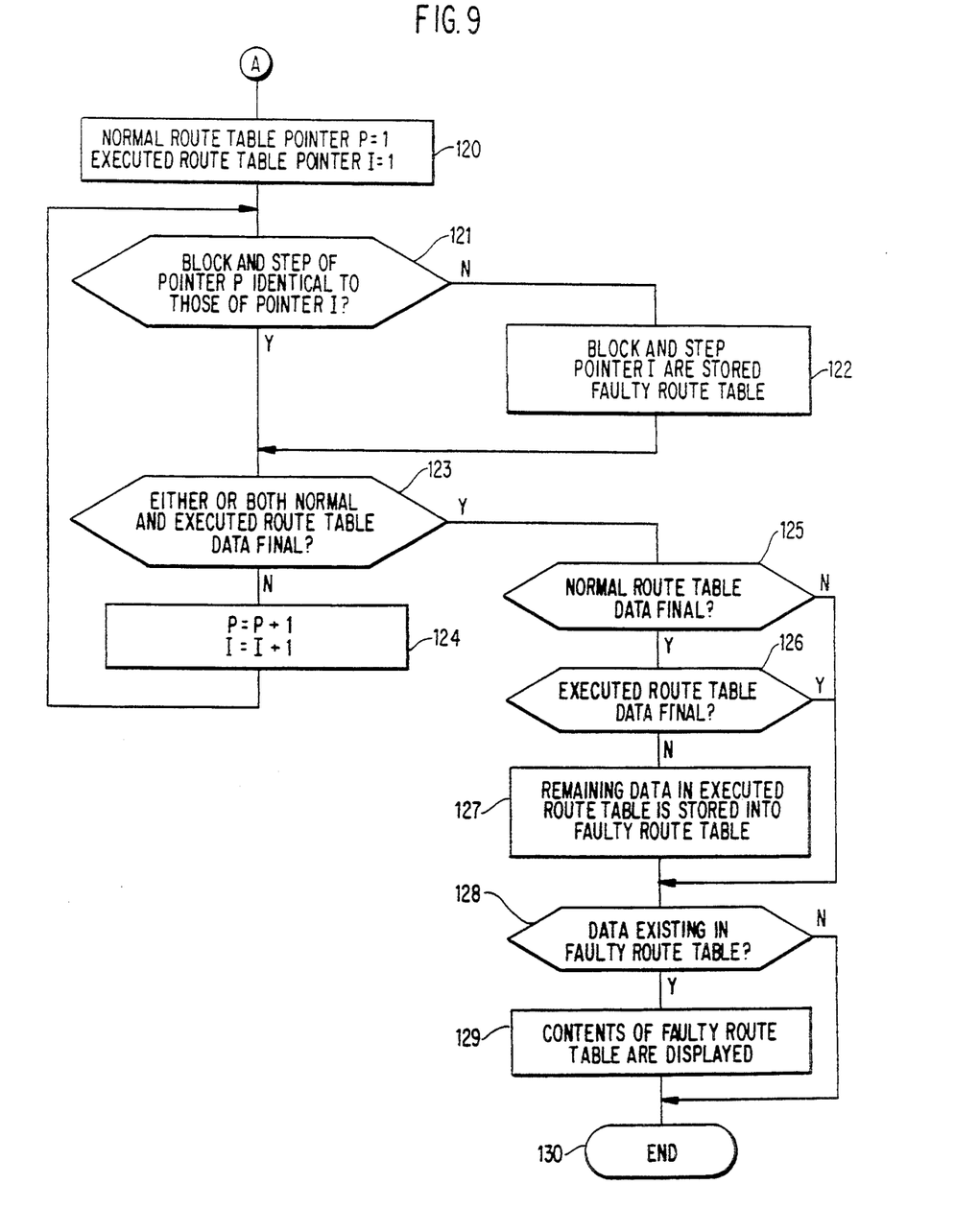

When the monitoring has been stopped at step 119 of FIG. 8, the value of the pointer 9A corresponding to the data in the normal route table 9 and that of the pointer I 10A corresponding to the data in the executed route table 10 are set to 1 at step 120 of FIG. 9. Then, at step 121, the peripheral device 8' compares the normal route block 9B and normal route step 9C of the pointer 9A in the normal route table 9 with the executed route block 10B and executed route step 10C of the pointer 10A in the executed route table 10. When they do not match, the unmatched executed route block 10B and executed route step 10C of the pointer 10A in the executed route table 10 are stored into the faulty route table 11 as shown in FIG. 6 at step 122.

At step 123, a check is then made to see whether the data of the normal route table 9 and that of the executed route table 10 are both final. With the exception that either or both of the data in the normal route table 9 and executed route table 10 is final, at the step 123, the pointer P 9A in the normal route table 9 and the pointer 10A in the executed route table 10 are incremented by 1 at step 124. In this manner, the tables now will refer to the next normal route block 9B/normal route step 9C and executed route block 10B/executed route step 10C. After the pointers have been incremented, the execution returns to step 121 and repeats the processing. When either or both of the normal route table 9 data and executed route table 10 data is final at the step 123, a check is made to see if data exists in the faulty route table 11 at step 125. When data exists, the contents of the faulty route table 11 are shown on a display (not illustrated) of the peripheral device 8' and the processing is terminated.

The preferred embodiments of the invention have been described with respect to SFC programs but may be applied to other programs such as ladder-type programs, as would be understood by one of ordinary skill.

The entire disclosure of each and every foreign patent application from which the benefit of foreign priority has been claimed in the present application is incorporated herein by reference, as if fully set forth.

Although this invention has been described in at least one preferred form with a certain degree of particularity, it is to be understood that the present disclosure of the preferred embodiments has been made only by way of example and that numerous changes in the details and arrangement of components may be made without departing from the spirit and scope of the invention as hereinafter claimed.

What is claimed is:

1. A program debugging device for debugging SFC programs that include blocks made up of a plurality of steps, comprising:
normal route registering means in which intended routes, along which a program is intended to run in a programmable controller for program-controlling an object to be controlled, are pre-registered;
program running means for running said program;
route comparing means for sequentially comparing the intended route registered in said normal route registering means and an actual route on which said program is actually run;
program stopping means for stopping the run of said program if a difference is found between said intended route and said actual route by said sequential comparison; and
displaying means for displaying a corresponding portion of said program where said difference has been found in said sequential comparison.

2. The apparatus of claim 1, wherein said display is of the block and step where said difference is identified.

3. The apparatus of claim 1, wherein said normal route registering means comprises means for registering new route portion information and correcting existing registered route information.

4. A programmable debugging device for debugging SFC programs that include blocks made up of a plurality of steps, comprising:
normal route registering means in which intended routes, along which a program is intended to run in an programmable controller for program-controlling an object to be controlled, are pre-registered;
program running means for running said program;
executed route registering means in which executed routes, along which said program is actually run, are registered sequentially;
route comparing means for sequentially comparing said intended route registered beforehand in said normal route registering means and said executed route registered in said executed route registering means; and
displaying means for displaying a portion of said program that corresponds to a difference found by the sequential comparison made by said route comparing means.

5. The apparatus of claim 4, wherein said route comparing means makes said comparison at the termination of said program run.

6. A program debugging process for debugging SFC programs that include blocks made up of a plurality of steps, comprising the steps of:
pre-registering a route along which a program is intended to run;
actually running said program and sequentially comparing the executed route, along which said program is actually run and said pre-registered route; and
identifying the existence of a difference between said pre-registered route and said actual route.

7. The method of claim 6, wherein said sequential comparing is performed on a block and step basis.

8. The method of claim 7, wherein said identifying step further comprises stopping the run of said SFC program if any difference is found.

9. The method of claim 7, further comprising displaying as an error a block and step of said executed route which is found by said sequential comparison to be different from said pre-registered route.

10. The method of claim 7, wherein the execution of a block and step is time limited.

11. The method of claim 6, wherein said pre-registering step comprises at least one of adding new data and correcting existing data.

12. A program debugging process for debugging SFC programs that include blocks made up of a plurality of steps, comprising the steps of:

pre-registering a route along which a program, having a plurality of portions, is intended to run;

actually running said program and sequentially registering the route on which said program is actually run;

comparing said pre-registered route on which said program is intended to run and said sequentially-registered route on which said program is actually run and identifying differences therebetween; and recording each program portion at which a difference is identified as a result of the comparing step.

13. The method of claim 12, wherein said comparing step is conducted until at least one of said pre-registered and sequentially registered routes is concluded, and wherein said recording step is conducted thereafter.

14. The method of claim 12, wherein the method further comprises displaying as an error the block and step of said sequentially-registered route for which a difference from said pre-registered route is identified.

15. The method of claim 12, wherein said program portion comprises a block and step, wherein and said method further comprises displaying the block and step information recorded in said recording step.

16. The method of claim 15, wherein said program running step is subject to time limits on the execution of each program portion.

17. The invention of any one of claims 1, 4, 6 and 12, wherein said program is a ladder program.

* * * * *